(12) United States Patent
Davidson et al.

(10) Patent No.: US 8,752,841 B2
(45) Date of Patent: Jun. 17, 2014

(54) GASKET WITH A COMPRESSION LIMITER

(75) Inventors: Michael Davidson, Royal Oak, MI (US);
Edward Lesnau, IV, Livonia, MI (US);
Chris LaFrenz, Shelby Township, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/475,025

(22) Filed: May 18, 2012

(65) Prior Publication Data

US 2013/0307224 A1 Nov. 21, 2013

(51) Int. Cl.
*F02F 11/00* (2006.01)

(52) U.S. Cl.
USPC .......................................................... 277/593

(58) Field of Classification Search
USPC .................................. 277/590, 593, 594, 595
See application file for complete search history.

(56) References Cited

U.S. PATENT DOCUMENTS

| | | | |
|---|---|---|---|
| 6,786,490 B2 * | 9/2004 | Fujino et al. | 277/590 |
| 7,490,835 B2 | 2/2009 | Diez et al. | |
| 7,527,269 B2 | 5/2009 | Tiefenbach et al. | |
| 2003/0062691 A1 | 4/2003 | Diez et al. | |
| 2003/0062692 A1 * | 4/2003 | Diez et al. | 277/591 |
| 2004/0160017 A1 * | 8/2004 | Diez et al. | 277/593 |
| 2005/0189724 A1 | 9/2005 | Schmitz | |
| 2006/0061045 A1 | 3/2006 | Burg | |
| 2009/0235715 A1 | 9/2009 | Werz | |
| 2010/0019459 A1 | 1/2010 | Salameh | |

FOREIGN PATENT DOCUMENTS

| | | |
|---|---|---|
| DE | 3633335 A1 | 4/1988 |
| DE | 4240661 A1 | 6/1994 |
| EP | 1536166 B1 | 11/2004 |
| EP | 1693606 B1 | 1/2006 |
| EP | 1635093 A1 | 3/2006 |
| EP | 1852638 B1 | 5/2007 |
| WO | WO2010/149774 | 12/2010 |

OTHER PUBLICATIONS

International Search Report, mailed Jun. 14, 2013 (PCT/US2013/025667).

* cited by examiner

*Primary Examiner* — Gilbert Lee
(74) *Attorney, Agent, or Firm* — Robert L. Stearns; Dickinson Wright, PLLC

(57) ABSTRACT

A cylinder head gasket has a functional layer with a plurality of openings with a compression bead surrounding at least one of the openings. The functional layer additionally includes a plurality of stoppers, or compression limiters, spaced from the compression bead for preventing full flattening of the compression bead between the engine block and the cylinder head and for limiting the expansion and contraction of the compression bead during and between firings in the cylinders of the engine block. At least one of the stoppers has a generally frustoconical shape with a top and a reverse-frustoconical opening in the top.

14 Claims, 3 Drawing Sheets

GASKET WITH A COMPRESSION LIMITER

BACKGROUND OF THE INVENTION

1. Field of the Invention

The present invention is generally related to gaskets of the type used to establish a gas-tight seal between two members to be clamped together and more particularly to cylinder head gaskets.

2. Related Art

In establishing a gas-tight seal between two members to be clamped together, such as a cylinder head and an engine block, it is common to use a cylinder head gasket having one or more layers. Generally, at least one of the layer(s), sometimes referred to as a functional layer, has a compression bead which deforms elastically when sandwiched between the cylinder head and engine block to establish the gas-tight seal. The gasket may also include one or more distance layers, which may be configured to backload stoppers and limit the compression of the compression bead, thereby improving fatigue resistance. Unfortunately, while fastening the cylinder head to the engine block, the compression bead can be over-compressed and substantially flattened. If the compression bead is over-compressed, in addition to losing its ability to maintain a gas-tight seal, fatigue cracks can form in the area of the compression bead during the initial clamping or while in use. Fatigue cracks can also be formed by movement of the cylinder head lifting upwardly during combustion in the cylinder then compressing back down on the gasket. If formed, fatigue cracks ultimately reduce the ability of the static gasket to maintain a gas-tight seal, thereby diminishing the life and performance of the engine.

Some gasket manufacturers have begun producing multi-layer gaskets including compression limiters for preventing, or at least reducing, flattening of the compression bead between the cylinder head and engine block. However, these compression limiters are often costly and laborious to produce or may not sufficiently protect the compression bead from flattening.

SUMMARY OF THE INVENTION

One aspect of the present invention provides a gasket for establishing a seal between a first member and a second member including at least one layer with at least one opening and at least one compression bead. The at least one compression bead projects out of a plane and extends at least partially around the opening. The gasket further includes at least one stopper, or compression limiter, integrally formed with at least one of the layer(s) and spaced from the compression bead. The stopper includes an outer wall which extends upwardly to a generally flat raised surface and an inner wall extending downwardly from the raised surface to a lower interior surface which extends continuously between the periphery of the inner wall and is recessed relative to the raised surface. The generally flat raised surface extends through an enclosed shape, such as an annular shape, a triangular shape, a square shape, etc. The stopper(s) may be formed quickly and with low cost and effectively increase the thickness of the layer to prevent full flattening of the compression bead.

According to another aspect of the invention, the gasket is a cylinder head gasket for establishing a gas-tight seal between an engine block and a cylinder head. The functional layer includes a plurality of stoppers, each of which has a generally frustoconical shape with a top and a reverse-frustoconical shape formed in its top to yield a double-walled conical shape.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
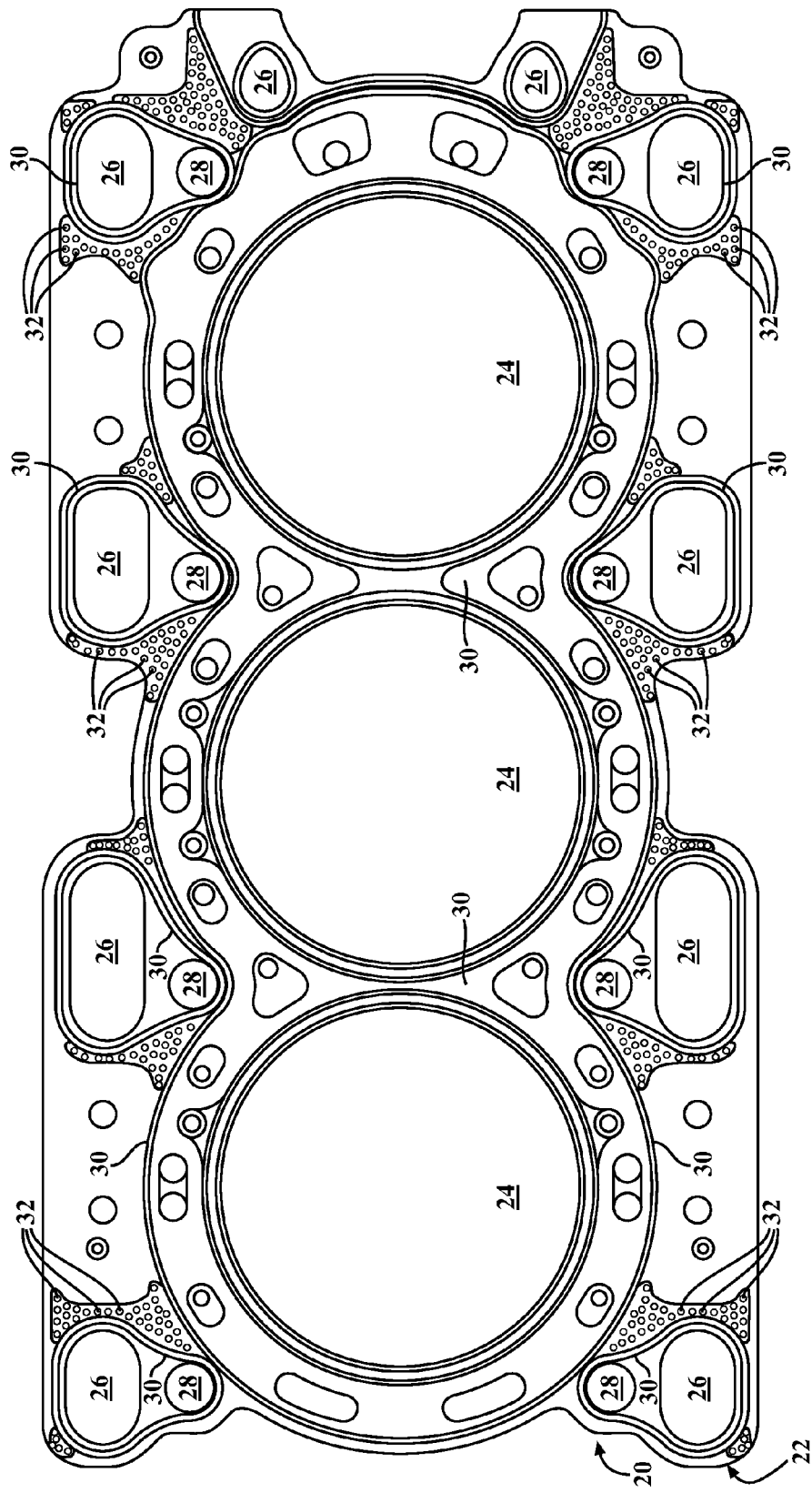
FIG. 1 is a top and elevated view of an exemplary gasket.
Figure 2:
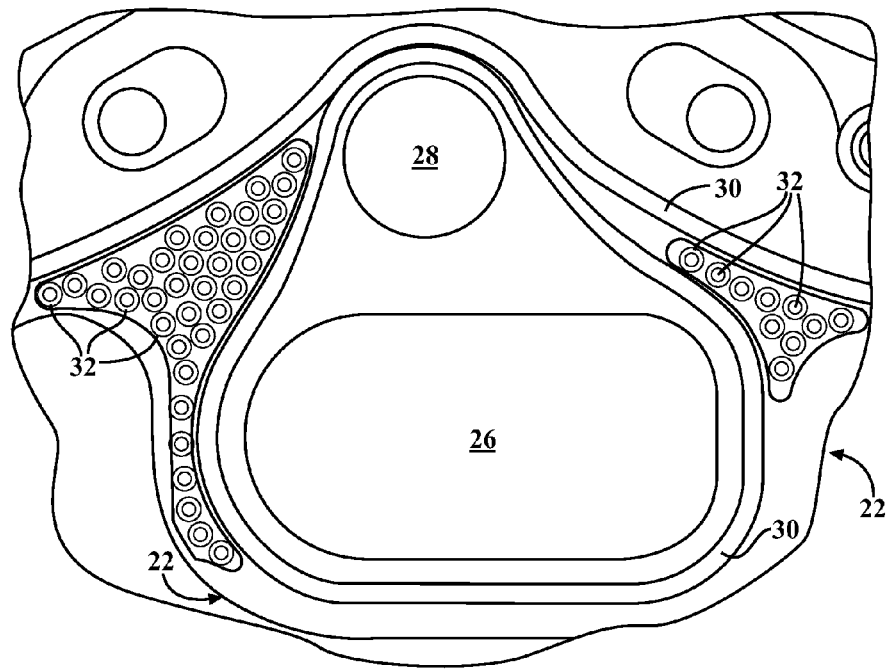
FIG. 2 is an enlarged view of a portion of the exemplary gasket surrounding a cooling path opening and mounting bolt opening.

Referring to the Figures, wherein like numerals indicate corresponding parts throughout the several views, a gasket 20 constructed according to one aspect of the present invention is generally shown in FIG. 1. The exemplary gasket 20 is configured for establishing a gas-tight seal between a cylinder head (not shown) and an engine block (not shown) but could find uses in many other automotive or non-automotive applications, i.e. the gasket 20 could be employed to seal any desirable types of first and second members.

The exemplary gasket 20 includes a single functional layer 22 with a plurality of cylinder bore openings 24 which are arranged and sized to correspond to cylinder bores (not shown) of the engine block, as is common in the art. The exemplary functional layer 22 also includes a plurality of fluid passage openings 26 which correspond to fluid passages (not shown) for conveying engine coolant between the engine block and the cylinder head and a plurality of bolt openings 28 which receive mounting bolts (not shown) to join the cylinder head with the engine block, as is also common in the art. Although the exemplary gasket 20 only includes a single functional layer 22 and no distance layers, it should be appreciated that the gasket 20 could include any desirable number of functional and/or distance layers in addition to the functional layer 22. The functional layer 22 is preferably formed of spring steel. However, it should be appreciated that it could be formed of any suitable resilient material.

The exemplary functional layer 22 includes a plurality of compression beads 30, each of which circumferentially surrounds at least one of the openings 24, 26, 28 for elastically deforming to establish the gas-tight seal between the cylinder head and the engine block. The compression beads 30 could be half-beads or full compression beads depending on the particular application. The functional layer 22 preferably includes at least one compression bead 30 extending around each of the cylinder bore openings 24 and each of the fluid passage openings 26.

The exemplary functional layer 22 additionally includes a plurality of stoppers 32, or compression limiters, which effectively increase the thickness of the functional layer 22 in certain, predetermined areas to limit the distance that the embossments are able to compress, both during the initial mounting of the cylinder head on the engine block and between firings in the cylinders. Increasing the effective thickness of the functional layer 22 in these areas has the effect of reducing the risk of fatigue cracks forming in the functional layer 22. Additionally, by preventing full flattening of the compression beads 30, the stoppers 32 improve the seal between the engine block and cylinder head.

Figure 3:
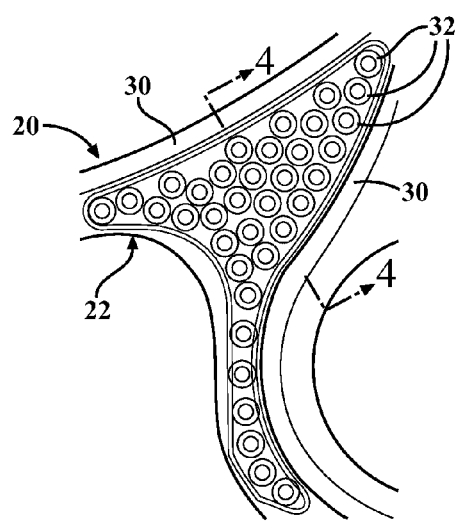
FIG. 3 is another enlarged view of a different portion of the exemplary gasket than shown in FIG. 2 and including a plurality of stoppers.

In the exemplary embodiment, the stoppers 32 are integrally formed into the functional layer 22 along with from the compression beads 30. However, for gaskets having multiple layers, the stoppers could be formed in any desirable layer. For example, if the gasket has a distance layer, then they could be formed in either the functional layer or the distance layer. If the gasket includes more than one functional layer, then the stoppers could be formed on any or all of the functional layers. As shown in FIG. 3, the exemplary stoppers 32 are disposed in very close proximity with one another in predetermined areas of the functional layer 22 adjacent to the compression beads 30 to effectively increase the thickness of the functional layer 22 only in those areas. However, it should be appreciated that the stoppers 32 could be formed in any desirable flat surface of any layer of the gasket 20 so long as they are spaced from the compression beads 30. For example, the stoppers 32 could be formed between the compression beads 30 and their respective openings 24, 26, 28 and/or they could be spaced from the compression beads 30 opposite of the openings 24, 26, 28. Generally, stoppers 32 which are closer to one another will provide more stiffness than stoppers 32 which are distanced from one another. However, the stoppers 32 could be spaced from one another by any desirable distance.

Figure 4:
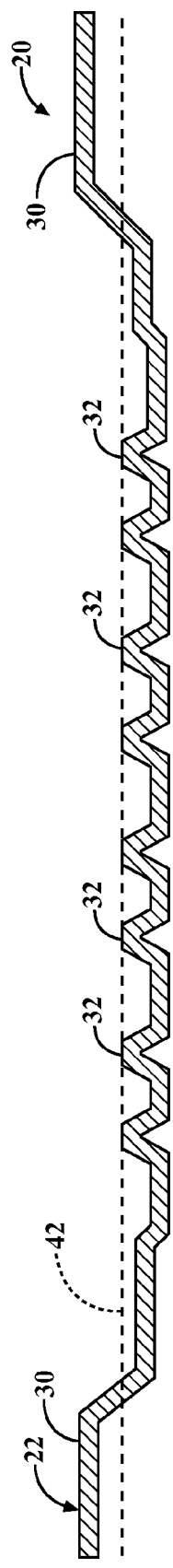
FIG. 4 is a cross-sectional view of the exemplary gasket taken along line 4-4 of FIG. 3.
Figure 5:
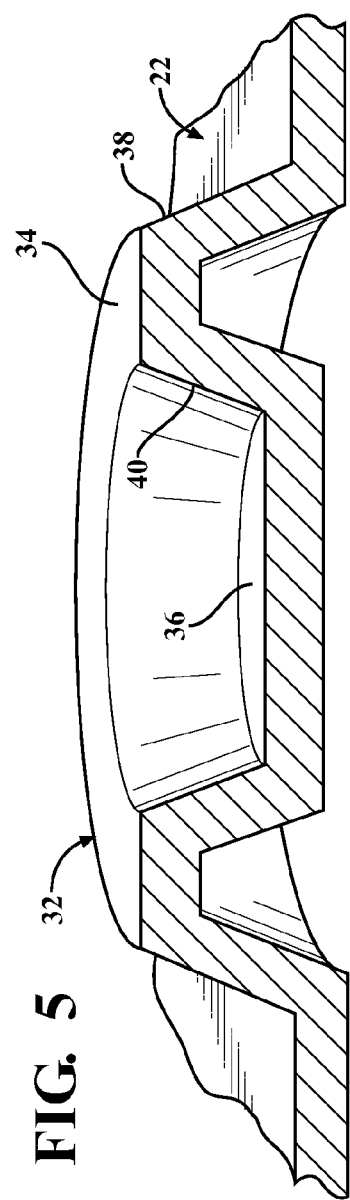
FIG. 5 is a perspective and sectional view of one of the exemplary stoppers.

Referring now to FIG. 5, each of the stoppers 32 of the exemplary embodiment has a generally frustoconical shape with a reverse-frustoconical opening in the top of the feature to yield a double-walled conical shape. The exemplary double-walled conical stopper 32 has a generally flat raised surface 34 with an annular shape and a generally flat depressed surface 36 which is recessed relative to the raised surface 34. An outer wall 38 extends upwardly from the area of the functional layer 22 surrounding the stopper 32 to the raised surface 34, and an inner wall 40 extends downwardly from the raised surface 34 to the depressed surface 36. The outer and inner walls 38, 40 of the stopper 32 preferably extend at an angle of between forty-five degrees (45°) and ninety degrees (90°) relative to the portions of the functional layer 22 surrounding the stopper 32. This configuration has been found to provide a desirable amount of stiffness to resist forces from the cylinder head moving in response to and between the firings in the cylinders. In operation, the stoppers 32 provide stiffness to certain areas of the functional layer 22 to prevent full flattening of the compression beads 30 and to limit the expansion and contraction of the compression beads 30 during and between firings in the cylinders. For example, the fully compressed embossment height is represented with a dashed line 42 in FIG. 4. As shown, the fully compressed height is raised relative to the flat adjacent portions of the stopper 32, and thus, the stoppers 32 prevent full flattening of the compression bead 30.

The exemplary depressed surface 36 is generally flat and does not include any apertures, ribs or any other features. Additionally, as shown in FIG. 4, the depressed surface 36 is generally planar with the portions of the functional layer 22 adjacent the stopper 32. However, it should be appreciated that the depressed surface 36 could alternately be higher or lower than the portions of the functional layer 22 adjacent the stopper 32, if desired. Additionally, in the exemplary embodiment, the predetermined areas of the functional layer 22 which include the stoppers 32 are recessed relative the other portions of the functional layer 22. This may be beneficial because it effectively increases the functional layer's 22 thickness on both of its sides, i.e. on both its top and bottom. However, it should be appreciated that the predetermined areas of the functional layer 22 including the stoppers 32 could alternately be generally planar with the other areas of the functional layer 22 or even raised relative thereto.

It should be appreciated that the stoppers 32 could take many forms other than the double-walled conical shape shown in the drawings and described above so long as it has a raised impression with a negative depressed inner area. Additionally, the raised surface 34 of the stopper 32 could extend through any desirable enclosed shape including, for example, a square, triangle, hexagon, ellipse or even an ambiguous shape.

The stoppers 32 are preferably formed through a pressing or embossing process along with the compression beads 30. Thus, the stoppers 32 may be formed very quickly and with very little or no additional manufacturing cost or time. However, it should be appreciated that the stoppers 32 could alternately be formed prior to or after the formation of the compression beads 30, and the stoppers 32 could be formed through any desirable shaping process.

Obviously, many modifications and variations of the present invention are possible in light of the above teachings and may be practiced otherwise than as specifically described while within the scope of the appended claims.

What is claimed is:

1. A gasket for establishing a seal between a first member and a second member, comprising:
   at least one layer having at least one opening and a compression bead projecting out of a plane, and wherein said compression bead extends at least partially around said opening;
   at least one stopper integrally formed with at least one of said at least one layer and spaced from said compression bead; and
   said stopper including an outer wall extending upwardly to a generally flat raised surface and an inner wall extending downwardly from said raised surface to a lower interior surface continuously extending between the periphery of said inner wall and being recessed relative to said raised surface, and wherein said generally flat raised surface extends through an enclosed shape which surrounds said lower interior surface.

2. The gasket as set forth in claim 1 wherein said stopper has a generally frustoconical shape with a reverse frustoconical opening.

3. The gasket as set forth in claim 2 wherein said generally flat raised surface has an annular shape.

4. The gasket as set forth in claim 1 wherein said at least one stopper is further defined as a plurality of stoppers.

5. The gasket as set forth in claim 4 wherein a plurality of said stoppers are disposed on the opposite side of said compression bead from said opening.

6. The gasket as set forth in claim 1 wherein said at least one compression bead and said at least one stopper are formed on the same layer.

7. The gasket as set forth in claim 6 wherein said at least one layer with said at least one compression bead and said at least one stopper is a functional layer.

8. A cylinder head gasket for establishing a gas-tight seal between a cylinder head and an engine block, comprising:
   at least one functional layer having at least one opening and at least one compression bead projecting out of a plane, wherein said at least one compression bead extends at least partially around said at least one opening;

at least one stopper integrally formed with said at least one functional layer and being spaced from said at least one compression bead and from said at least one opening;

said at least one stopper having a generally frustoconical shape with a top presenting a generally reverse-frustoconical opening, said top having a generally flat raised surface, said reverse-frustoconical opening having a lower interior surface, and wherein said generally flat raised surface extends through an enclosed shape which surrounds said lower interior surface.

9. The cylinder head gasket as set forth in claim 8 wherein said at least one stopper is further defined as a plurality of stoppers.

10. The cylinder head gasket as set forth in claim 8 wherein said raised surface of said stopper has a generally annular shape.

11. The cylinder head gasket as set forth in claim 10 wherein said stopper has a depressed surface being recessed relative to said raised surface.

12. The cylinder head gasket as set forth in claim 8 wherein said stopper is integrally formed in the same functional layer as said at least one compression bead.

13. The cylinder head gasket as set forth in claim 8 wherein said stoppers are spaced from said at least one compression bead on the opposite side of said at least one opening.

14. A method of making a gasket, comprising:

preparing a functional layer having at least one opening and at least one compression bead at least partially surrounding said at least one opening; and pressing at least one stopper having a generally frustoconical shape with a top and a reverse frustoconical opening in the top, the top having a generally flat raised surface, the reverse frustoconical opening having a lower interior surface, and wherein the generally flat raised surface extends through an enclosed shape which surrounds the lower interior surface.

\* \* \* \* \*